(12) United States Patent
Gong et al.

(10) Patent No.: US 12,519,901 B2
(45) Date of Patent: Jan. 6, 2026

(54) VIDEO FRAME ADJUSTMENT METHOD, ELECTRONIC DEVICE AND NON-TRANSIENT COMPUTER-READABLE STORAGE MEDIUM

(71) Applicant: Beijing Zitiao Network Technology Co., Ltd., Beijing (CN)

(72) Inventors: Lixue Gong, Beijing (CN); Rui Zhang, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 15 days.

(21) Appl. No.: 18/682,403

(22) PCT Filed: Aug. 16, 2022

(86) PCT No.: PCT/CN2022/112783
§ 371 (c)(1),
(2) Date: Feb. 8, 2024

(87) PCT Pub. No.: WO2023/020492
PCT Pub. Date: Feb. 23, 2023

(65) Prior Publication Data
US 2024/0357054 A1   Oct. 24, 2024

(30) Foreign Application Priority Data
Aug. 16, 2021 (CN) .......................... 202110939314.8

(51) Int. Cl.
*H04N 7/01* (2006.01)
*G06T 3/02* (2024.01)
(Continued)

(52) U.S. Cl.
CPC ............. *H04N 7/0135* (2013.01); *G06T 3/02* (2024.01); *G06T 7/20* (2013.01); *G06V 10/44* (2022.01);
(Continued)

(58) Field of Classification Search
CPC ...... H04N 7/0135; H04N 19/59; G06V 10/56; G06V 10/803; G06V 10/44; G06T 3/02; G06T 7/20; G06T 2207/30241
See application file for complete search history.

(56) References Cited

U.S. PATENT DOCUMENTS

2016/0301881 A1* 10/2016 Taggart .................. H04N 5/144
2019/0138889 A1*  5/2019 Jiang ..................... G06N 3/045
2022/0327318 A1* 10/2022 Radhakrishnan ... G06F 18/2411

FOREIGN PATENT DOCUMENTS

| CN | 109151474 A | 1/2019 |
| CN | 111372087 A | 7/2020 |

(Continued)

OTHER PUBLICATIONS

International Search Report and Written Opinion in PCT/CN2022/112783, mailed Oct. 26, 2022, 14 pages.
(Continued)

*Primary Examiner* — Yassin Alata
(74) *Attorney, Agent, or Firm* — Astute IP Law Group

(57) ABSTRACT

A video frame adjustment method, an electronic device and a non-transient computer-readable storage medium are provided. The method includes: determining, based on a first video frame and a second video frame in an initial video, a first optical flow from the first video frame to the second video frame and a second optical flow from the second video frame to the first video frame through a quantization neural network; determining a third optical flow from an intermediate frame to the first video frame and a fourth optical flow
(Continued)

from the intermediate frame to the second video frame; determining the intermediate frame according to the first video frame, the second video frame, the third optical flow and the fourth optical flow; inserting, in the initial video, the intermediate frame between the first video frame and the second video frame to obtain a target video.

17 Claims, 3 Drawing Sheets

(51) Int. Cl.
    *G06T 7/20*     (2017.01)
    *G06V 10/44*     (2022.01)
    *G06V 10/56*     (2022.01)
    *G06V 10/80*     (2022.01)
    *H04N 19/59*     (2014.01)

(52) U.S. Cl.
    CPC ............ *G06V 10/56* (2022.01); *G06V 10/803* (2022.01); *H04N 19/59* (2014.11); *G06T 2207/30241* (2013.01)

(56) References Cited

FOREIGN PATENT DOCUMENTS

| | | |
|---|---|---|
| CN | 112104830 A | 12/2020 |
| CN | 112184779 A | 1/2021 |
| CN | 112712537 A | 4/2021 |
| CN | 112995715 A | 6/2021 |
| DE | 102018127265 A1 | 5/2019 |
| WO | 2021085757 A1 | 5/2021 |

OTHER PUBLICATIONS

Office Action for Chinese Patent Application No. 202110939314.8, mailed on Apr. 1, 2025, 12 pages.

* cited by examiner

VIDEO FRAME ADJUSTMENT METHOD, ELECTRONIC DEVICE AND NON-TRANSIENT COMPUTER-READABLE STORAGE MEDIUM

CROSS-REFERENCE TO RELATED APPLICATION

This is a national stage application based on International Patent Application No. PCT/CN2022/112783, filed Aug. 16, 2022, which claims priority to Chinese patent application No. 202110939314.8 titled "VIDEO FRAME ADJUSTMENT METHOD AND APPARATUS, AND ELECTRONIC DEVICE AND STORAGE MEDIUM" filed on Aug. 16, 2021, the disclosures of which are incorporated herein by reference in their entireties.

TECHNICAL FIELD

The present disclosure relates to the technical field of video, and especially to a video frame adjustment method, apparatus, electronic device and storage medium.

BACKGROUND

The video is an important medium for Internet information dissemination. The factors such as color, frame rate and definition of the video will affect the playing effect of the video, and in turn affect the viewing experience of the user. The higher the frame rate of the video is, the more smoothly the video is played and the better the viewing experience of the user is.

With the development of the hardware of video playing devices, more and more video playing devices support playing of a high frame rate video.

However, the effect of increasing of video frame rate achieved by the current video frame rate increasing technology is not ideal.

SUMMARY

In order to solve the above technical problem or at least partially solve the above technical problem, the embodiments of the present disclosure provide a video frame adjustment method, apparatus, electronic device and storage medium, which achieve a purpose of inserting a frame between two adjacent video frames, and at the same time can guarantee the playing effect of a high frame rate video after the frame insertion.

In a first aspect, the embodiments of the present disclosure provide a video frame adjustment method, comprising:
  determining, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames;
  determining, based on the first optical flow and the second optical flow, a third optical flow from an intermediate frame to the first video frame and a fourth optical flow from the intermediate frame to the second video frame, wherein the intermediate frame is an estimated video frame to be inserted between the first video frame and the second video frame;
  determining the intermediate frame according to the first video frame, the second video frame, the third optical flow and the fourth optical flow;
  inserting, in the initial video, the intermediate frame between the first video frame and the second video frame to obtain a target video.

In a second aspect, the embodiments of the present disclosure provide a video frame adjustment apparatus, comprising:
  a first determination module, configured to determine, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames;
  a second determination module, configured to determine, based on the first optical flow and the second optical flow, a third optical flow from an intermediate frame to the first video frame and a fourth optical flow from the intermediate frame to the second video frame, wherein the intermediate frame is an estimated video frame to be inserted between the first video frame and the second video frame;
  a third determination module, configured to determine the intermediate frame according to the first video frame, the second video frame, the third optical flow and the fourth optical flow;
  a frame insertion module, configured to insert, in the initial video, the intermediate frame between the first video frame and the second video frame to obtain a target video.

In a third aspect, the embodiments of the present disclosure provide an electronic device, comprising:
  one or more processors;
  a storage apparatus, configured to store one or more programs;
  the one or more programs, when executed by the one or more processors, cause the one or more processors to implement the above-mentioned video frame adjustment method.

In a fourth aspect, the embodiments of the present disclosure provide a computer-readable storage medium having stored thereon a computer program which, when executed by a processor, implements the above-mentioned video frame adjustment method.

In a fifth aspect, the embodiments of the present disclosure provide a computer program product comprising computer programs/instructions which, when executed by a processor, implements the above-mentioned video frame adjustment method.

The technical scheme provided by the embodiments of the present disclosure has at least the following advantages.

The video frame adjustment method provided by the embodiments of the present disclosure: determines, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames, so that the video frame adjustment method provided by the embodiments of the present disclosure can be executed on a mobile device and be more robust for videos in large moving scenarios; determines, based on the first optical flow and the second optical flow, a third optical flow from an intermediate frame to the first video frame and a fourth optical flow from the intermediate frame to the second video frame, wherein the intermediate frame is an estimated video frame to be inserted between the first video frame and the second video frame; determines the intermediate frame according to the first video frame, the second video frame, the third optical flow and the fourth optical flow; inserts, in the initial video, the intermediate frame between the first video frame and the second video frame, so that the purpose of inserting a frame between two adjacent video frames can be achieved, and at the same time the playing effect of a high frame rate video after the frame insertion can be guaranteed.

BRIEF DESCRIPTION OF DRAWINGS

The above and other features, advantages and aspects of the embodiments of the present disclosure will become more apparent by referring to the following detailed description when taken in conjunction with the accompanying drawings. Throughout the accompanying drawings, the same or similar reference numerals indicate the same or similar elements. It should be understood that the accompanying drawings are schematic, and the components and elements are not necessarily drawn to scale.

DETAILED DESCRIPTION

The embodiments of the present disclosure will be described in more detail below with reference to the accompanying drawings. Although certain embodiments of the present disclosure are shown in the accompanying drawings, it should be understood that the present disclosure can be embodied in various forms and should not be construed as limited to the embodiments set forth herein, but rather, these embodiments are provided for a more thorough and complete understanding of the present disclosure. It should be understood that the accompanying drawings and embodiments of the present disclosure are only used for illustrative purposes, and are not used to limit the protection scope of the present disclosure.

It should be understood that various steps recited in the method implementations of the present disclosure may be executed in a different order and/or in parallel. Furthermore, the method implementations may include additional steps and/or omit execution of the illustrated steps. The scope of the present disclosure is not limited in this respect.

As used herein, the term "including" and its variants are openly inclusive, that is, "including but not limited to". The term "based on" is "at least partially based on". The term "an embodiment" means "at least one embodiment"; the term "another embodiment" means "at least one other embodiment"; the term "some embodiments" means "at least some embodiments". The relevant definitions of other terms will be given in the following description.

It should be noted that the concepts such as "first" and "second" mentioned in the present disclosure are only used to distinguish different apparatuses, modules or units, and are not used to limit the order or interdependence of the functions performed by these apparatuses, modules or units.

It should be noted that the modifications such as "one" and "multiple" mentioned in the present disclosure are schematic rather than limiting, and it should be understood by those skilled in the art as "one or more", unless clearly indicated otherwise in the context.

The names of messages or information exchanged among multiple apparatuses in the implementations of the present disclosure are only used for illustrative purposes, and are not used to limit the scope of such messages or information.

Figure 1:
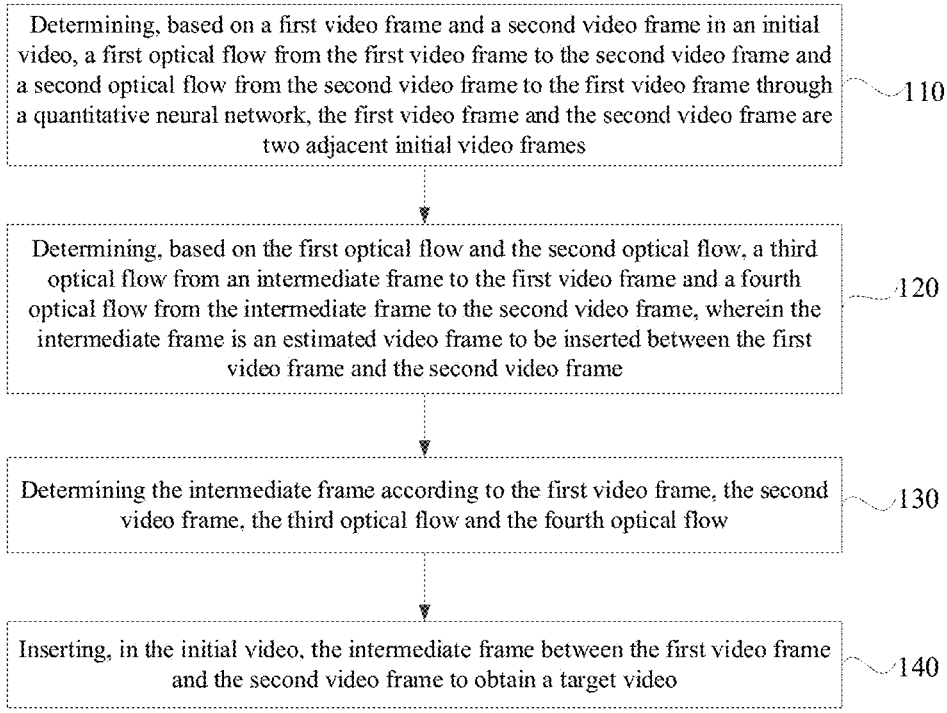
FIG. 1 is a flowchart of a video frame adjustment method in an embodiment of the present disclosure.

FIG. 1 is a flowchart of a video frame adjustment method in an embodiment of the present disclosure. The method may be performed by a video frame adjustment apparatus, which can be implemented by means of software and/or hardware, and may be configured in electronic devices such as terminals. The terminals specifically include but are not limited to smart phones, palmtop computers, tablet computers, wearable devices with display screens, desktops, notebook computers, all-in-one machines, smart home devices with display screens, etc.

As shown in FIG. 1, the method may specifically comprises the following steps:

Step 110: determining, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames.

The initial video refers to an original video shot or recorded by a photographing device. In other words, the initial video refers to a video on which no frame insertion is performed. The video frames in the initial video are the initial video frames. Two adjacent video frames refer to two video frames that are temporally adjacent. For example, if the first video frame is acquired at timing 0 and the second video frame is acquired at timing 1, then the first video frame and the second video frame are two video frames that are temporally adjacent.

A quantization neural network may refer to a neural network that stores model parameters in INT8 (8-bit fixed-point integer). The meaning of quantization generally refers to converting the floating-point algorithm of the neural network into a fixed-point one, so that the neural network can be executed on a mobile device (typically, such as smart phone) in real time, taking into account the performance limitations of mobile devices in terms of memory. By employing the quantization neural network to perform estimation on motion of a target object in two adjacent video frames, the video frame adjustment method provided by this embodiment is enable to produce a better frame insertion effect for complex moving scenarios, and to guarantee the play effect of the target video obtained after the frame insertion; by designing an efficient quantization neural network, the video frame adjustment method is enabled to be executed on a mobile terminal in real time, specifically enabled to be executed on the processor of the mobile terminal that supports quantization computation; and by performing video frame adjustment in real time through the processor of the mobile terminal, the purpose of increasing the video frame rate can be achieved and the play of video can be made smoother.

Figure 2:
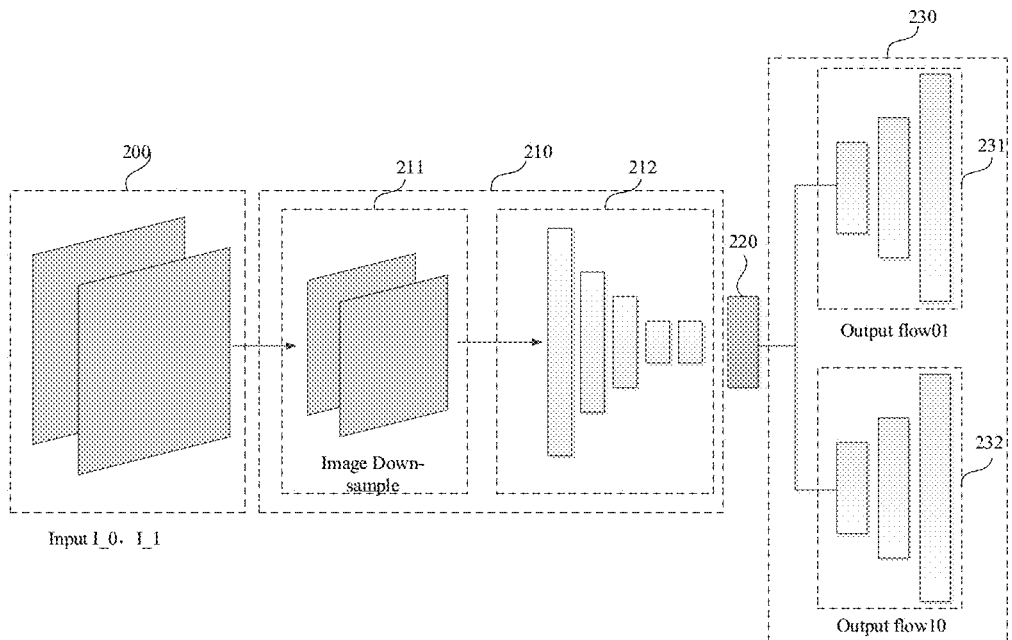
FIG. 2 is a structural schematic diagram of a quantization neural network in an embodiment of the present disclosure.

In one specific implementation, referring to a structural schematic diagram of a quantization neural network as shown in FIG. 2, the quantization neural network includes an encoder module 210, a decoder module 220 and two optical flow prediction branches 230 that are cascaded. Further, the two optical flow prediction branches 230 can be specifically divided into a first prediction branch 231 and a second prediction branch 232. The encoder module 210 includes a down-sampling unit 211 and an encoding unit 212, in which the down-sampling unit 211 is configured to down-sample two input video frames 200 (i.e., a input first video frame and a second video frame) respectively, and input the down-sampled images respectively corresponding to the two input video frames 200 (i.e., the down-sampled image of the first video frame and the down-sampled image of the second video frame) to the encoding unit 212, so that the encoding unit 212 performs feature extraction based on the down-sampled images to obtain codes of a feature image, and transmits the codes to the decoder module 220. The decoder module 220 includes a decoding unit and an up-sampling unit, in which the decoding unit is configured to decode the codes of the feature image and input the decoded feature image to the up-sampling unit, so that the up-sampling unit up-samples the decoded feature image and inputs the obtained up-sampled image to the two optical flow prediction branches 230 respectively, in order for the two optical flow prediction branches 230 to predict a first optical flow from the first video frame to the second video frame and a second optical flow from the second video frame to the first video frame based on the up-sampled image, respectively. For example, the first optical flow flow01 from the first video frame to the second video frame is predicted by the first prediction branch 231, and the second optical flow flow10 from the second video frame to the first video frame is predicted by the second prediction branch 232. That is, the input of the encoder module 210 is the first video frame I_0 and the second video frame I_1. Before performing feature extraction by the encoding unit 212, the first video frame I_0 and the second video frame I_1 are down-sampled by the down-sampling unit 211 to improve the receptive field of the neural network. The benefit of such setting is that it is possible for the neural network to be more robust to motion estimation in large moving scenarios, while it is also possible for neural network reasoning on small resolution images to improve speed of reasoning. In order for the neural network to operate on a mobile device efficiently, the training of the neural network is carried out in a quantitative way. For example, an INT8-type quantization neural network can be finally obtained, the essence of which is to store model parameters in INT8-type (8-bit fixed-point integer).

Step 120: determining, based on the first optical flow and the second optical flow, a third optical flow from an intermediate frame to the first video frame and a fourth optical flow from the intermediate frame to the second video frame, in which the intermediate frame is an estimated video frame to be inserted between the first video frame and the second video frame.

Figure 3:
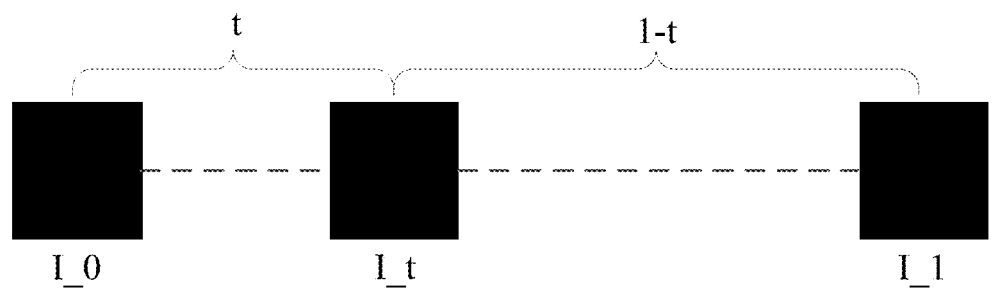
FIG. 3 is a schematic diagram of a timing relationship between video frames in an embodiment of the present disclosure.

In one implementation, determining, based on the first optical flow and the second optical flow, the third optical flow from the intermediate frame to the first video frame and the fourth optical flow from the intermediate frame to the second video frame comprises: determining, based on the first optical flow, the second optical flow and a moving trajectory of a target object in the first video frame and the second video frame, a fifth optical flow from the first video frame to the intermediate frame and a sixth optical flow from the second video frame to the intermediate frame; determining, through an optical flow inversion technology, the third optical flow based on the fifth optical flow, and the fourth optical flow based on the sixth optical flow. Specifically, assuming that the first video frame is I_0 and the second video frame is I_1, and the intermediate frame is a video frame at a certain timing t between timing 0 and timing 1, which is marked as I_t. Accordingly, reference can be made to a schematic diagram of a timing relationship between video frames as shown in FIG. 3. The optical flow from the first video frame I_0 to the intermediate frame I_t is marked as the fifth optical flow, and the optical flow from the second video frame I_1 to the intermediate frame I_t is marked as the sixth optical flow. Taking the movement of the target object between the first video frame I_0 and the second video frame I_1 being a linear movement as an example, the fifth optical flow from the first video frame I_0 to the intermediate frame I_t is flow0t=flow01*t, and the sixth optical flow from the second video frame I_1 to the intermediate frame I_t is flow1t=flow10*(1−t), flow01 represents the first optical flow from the first video frame I_0 to the second video frame I_1, and flow10 represents the second optical flow from the second video frame I_1 to the first video frame I_0, which can be obtained specifically through the quantization neural network in the above step 110. After obtaining the fifth optical flow flow0t from the first video frame I_0 to the intermediate frame I_t and the sixth optical flow flow1t from the second video frame I_1 to the intermediate frame I_t, the third optical flow flowt0 from the intermediate frame I_t to the first video frame I_0 and the fourth optical flow flowt1 from the intermediate frame I_t to the second video frame I_1 may be determined by the optical flow inversion technology. The purpose of generating the third optical flow from the intermediate frame I_t to the first video frame I_0 and the fourth optical flow from the intermediate frame I_t to the second video frame I_1 is to guarantee that every pixel on the intermediate frame I_t has a corresponding pixel on the first video frame I_0 and the second video frame I_1, so as to ensure the continuity of the video pictures on the intermediate frame I_t, the first video frame I_0 and the second video frame I_1, thereby achieving a good frame insertion effect.

In one implementation, determining, through the optical flow inversion technology, the third optical flow based on the fifth optical flow and the sixth optical flow comprises:

If a first pixel point on the intermediate frame has a preset relationship with a unique second pixel point on the first video frame, a first optical flow vector of the first pixel point from the intermediate frame to the first video frame is an inverse vector of a second optical flow vector of the second pixel point from the first video frame to the intermediate frame, in which the fifth optical flow includes the second optical flow vector. The essence of the preset relationship between the first pixel point on the intermediate frame and the unique second pixel point on the first video frame is that: when the unique second pixel point on the first video frame moves from timing 0 to timing t, it reaches the position of the first pixel point on the intermediate frame.

If the first pixel point on the intermediate frame has a preset relationship with at least two second pixel points on the first video frame, the first optical flow vector is a weighted average of inverse vectors of respective second optical flow vectors of the at least two second pixel points from the first video frame to the intermediate frame. The essence of the preset relationship between the first pixel point on the intermediate frame and the at least two second pixel points on the first video frame is that: when the at least two second pixel points on the first video frame move from timing 0 to timing t, they reach the position of the first pixel point on the intermediate frame. If there is no second pixel point on the first video frame that has a preset relationship with the first pixel point on the intermediate frame, the first optical flow vector is 0. The essence of there being no second pixel point on the first video frame that has the preset relationship with the first pixel point on the intermediate frame is that: when all the pixel points on the first video frame move from timing 0 to timing t, they all fail to reach the position of the first pixel point on the intermediate frame. The first optical flow vectors of each of the first pixel points on the intermediate frame from the intermediate frame to the first video frame constitute the third optical flow.

Figure 4:
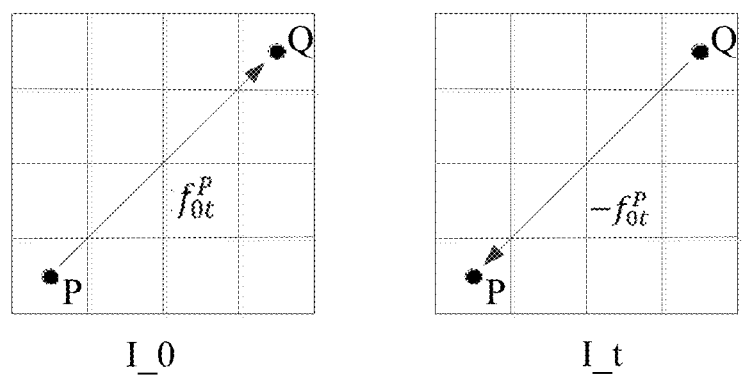
FIG. 4 is a schematic diagram of a second optical flow vector $f_{0_t}^P$ of a second pixel point P from a first video frame I_0 to an intermediate frame I_t and a first optical flow vector $-1*f_{0_t}^P$ of a first pixel point Q from the intermediate frame I_t to the first video frame I_0 in an embodiment of the present disclosure.

Specifically, for the second pixel point P on the first video frame I_0, the position of the first pixel point Q corresponding to the second pixel point P when moving from the first video frame I_0 to the intermediate frame I_t can be calculated from the second light flow vector $f_{0t}^P$ of the second pixel point P from the first video frame I_0 to the intermediate frame I_t, therefore, the light flow vector of the first pixel point Q from timing t to timing 0 is $-1*f_{0t}^P$. That is, the first light flow vector of the first pixel point Q from the intermediate frame I_t to the first video frame I_0 is the inverse vector of the second light flow vector $f_{0t}^P$ of the second pixel point P from the first video frame I_0 to the intermediate frame I_t, specifically $f_{t0}^Q = -1*f_{0t}^P$, where $f_{t0}^Q$ represents the first light flow vector, and $f_{0t}^P$ represents the second light flow vector. Accordingly, reference can be made to a schematic diagram of a second light flow vector $f_{0t}^P$ of the second pixel point P from the first video frame I_0 to the intermediate frame I_t and a first light flow vector $-f_{0t}^P$ of the first pixel point Q from the intermediate frame I_t to the first video frame I_0 as shown in FIG. 4.

In one implementation, it may appear that the optical flow vectors of a plurality of second pixel points P on the first video frame I_0 arrive at a same first pixel point Q on the intermediate frame I_t. That is, the first pixel point Q corresponds to at least two of the second pixel points P, or in other words, the first pixel point Q on the intermediate frame I_t has a preset relationship with at least two of the second pixel points P on the first video frame I_0. At this time, when calculating the first optical flow vector of the first pixel point Q from the intermediate frame I_t to the first video frame I_0, it is required to perform weighted averaging on the inverse vectors of the second optical flow vectors $f_{0t}^P$ of the plurality of second pixel points P arriving at the first pixel point Q from the first video frame I_0 to the intermediate frame I_t, specifically $$f_{t0}^Q = \frac{1}{N}\sum_P -1*f_{0t}^P,$$

where N represents a number of second optical flow vectors $f_{0t}^P$ taking the first pixel point P as the destination.

In one implementation, there may be a case where there is no optical flow vector pointing to the first pixel point Q. That is, there is no second pixel point P corresponding to the first pixel point Q, or in other words, there is no second pixel point P on the first video frame I_0 that has a preset relationship with the first pixel point Q on the intermediate frame I_t, then the first optical flow vector is 0. At the same time, the first pixel point Q is marked as an optical flow void point. The first optical flow vectors of each of the first pixel points Q on the intermediate frame from the intermediate frame to the first video frame constitute the third optical flow.

The approach of determining the fourth optical flow is similar to the approach of determining the third optical flow described above. Specifically, determining the fourth optical flow based on the sixth optical flow comprises:

If a third pixel point on the intermediate frame has a preset relationship with a unique fourth pixel point on the second video frame, a third optical flow vector of the third pixel point from the intermediate frame to the second video frame is an inverse vector of a fourth optical flow vector of the fourth pixel point from the second video frame to the intermediate frame, in which the sixth optical flow includes the fourth optical flow vector.

If the third pixel point on the intermediate frame has a preset relationship with at least two fourth pixel points on the second video frame, the third optical flow vector is a weighted average of inverse vectors of the fourth optical flow vectors of the at least two fourth pixel points respectively from the second video frame to the intermediate frame. If there is no fourth pixel point on the second video frame that has a preset relationship with the third pixel point on the intermediate frame, the third optical flow vector is 0. The third optical flow vectors of each of the third pixel points on the intermediate frame from the intermediate frame to the second video frame constitute the fourth optical flow.

Step 130: determining the intermediate frame according to the first video frame, the second video frame, the third optical flow and the fourth optical flow.

In one implementation, the determining the intermediate frame according to the first video frame, the second video frame, the third optical flow and the fourth optical flow comprises:

performing image affine transformation on the first video frame, to obtain a first transformed frame of the first video frame at a timing when the intermediate frame is acquired; performing image affine transformation on the second video frame, to obtain a second transformed frame of the second video frame at a timing when the intermediate frames acquired; predicting, based on the down-sampled image corresponding to the first video frame, the down-sampled image corresponding to the second video frame, the first transformed frame, the second transformed frame, the third optical flow and the fourth optical flow, fusion weights of the first transformed frame and second transformed frame, through a preset neural network; fusing pixels in the first transformed frame and the second transformed frame based on the fusion weights to obtain the intermediate frame, in which a fusion weight represents a probability that a pixel on the intermediate frame comes from the first video frame or the second video frame.

The first video frame I_0 is image affine transformed, that is, the first video frame I_0 is warp transformed, so as to obtain the first transformed frame $I\_t^0$ of the first video frame at timing t when the intermediate frame is acquired. The second video frame I_1 is image affine transformed, that is, the second video frame I_1 is warp transformed, so as to obtain the second transformed frame $I\_t^1$ of the second video frame at timing t when the intermediate frame is acquired. The purpose of image affine transformation is to estimate the video frame of the first video frame I_0 at timing t and the video frame of the second video frame I_1 at timing t, so as to provide a data source for obtaining the intermediate frame I_t.

Figure 5:
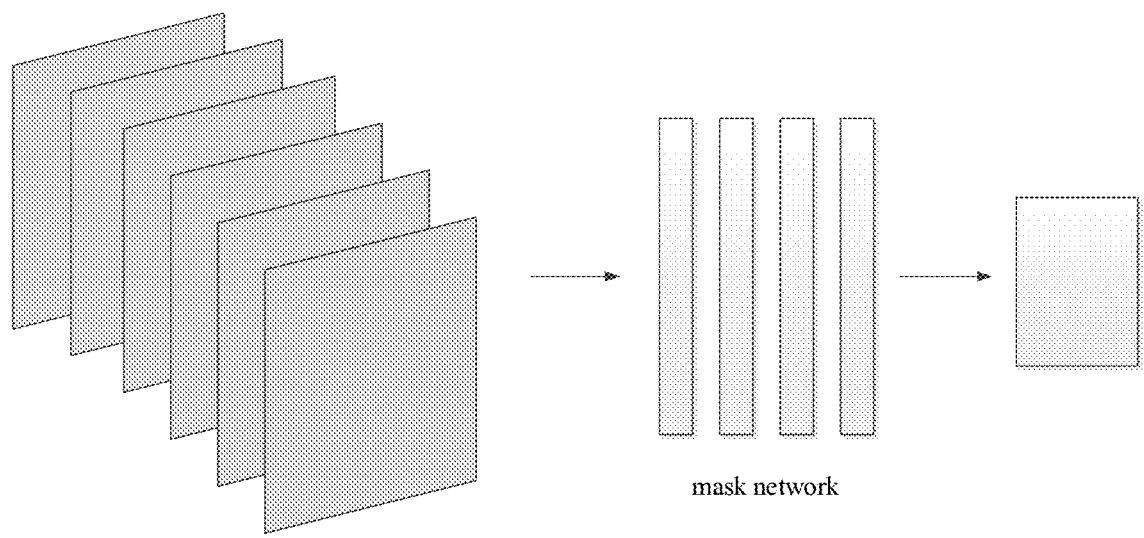
FIG. 5 is a flowchart of predicting a masked image through a preset neural network in an embodiment of the present disclosure.

In order to obtain the intermediate frame I_t, it is required to infer whether a certain pixel point in the intermediate frame comes from the first video frame I_0 or the second video frame I_1. With respect to this problem, in one implementation, a preset neural network is designed to predict a masked image "mask" (i.e., the fusion weights of the first transformed frame and the second transformed frame), and the value range of the pixel value in the masked image "mask" is 0-1, which represents a probability that this pixel point comes from the first video frame I_0. The more the pixel value approaches 1, the greater the probability that this pixel point comes from the first video frame I_0 is. The input of the preset neural network includes: the first transformed frame $I\_t^0$, the second transformed frame $I\_t^1$, the third optical flow flowt0, the fourth optical flow flowt1, the down-sampled image corresponding to the first video frame I_0 and the down-sampled image corresponding to the second video frame I_1. The output of the preset neural network is a masked image "mask". Synoptically, the fusion weights of the first transformed frame and second transformed frame are predicted based on the down-sampled image corresponding to the first video frame, the down-sampled image corresponding to the second video frame, the first transformed frame, the second transformed frame, the third optical flow and the fourth optical flow, through the preset neural network; and the pixels in the first transform frame and second transform frame are fused based on the fusion weights, so as to obtain the intermediate frame, in which a fusion weight represents a probability that a pixel on the intermediate frame comes from the first video frame or the second video frame. Correspondingly, reference can be made to a flowchart of predicting a masked image through a preset neural network as shown in FIG. 5, in which the down-sampled image corresponding to the first video frame, the down-sampled image corresponding to the second video frame, the first transformed frame, the second transformed frame, the third optical flow and the fourth optical flow are input into the mask network, so as to obtain the masked image, that is, the fusion weights of the first transformed frame and the second transformed frame.

Further, the fusing the pixels in the first transformed frame and the second transformed frame based on the fusion weights (i.e., the pixel values in the masked image) to obtain the intermediate frame comprises: obtaining the intermediate frame based on the following equation $$I_t = \text{mask} \circ I_t^0 + (1 - \text{mask}) \circ I_t^1$$

$I_t$ represents the intermediate frame, "mask" represents the masked image, $I_t^0$ represents the first transformed frame, $I_t^1$ represents the second transformed frame, and the symbol of "∘" represents pixel-wise multiplication.

Step 140: inserting, in the initial video, the intermediate frame between the first video frame and the second video frame to obtain a target video.

The video frame adjustment method provided by the embodiments of the present disclosure enables the video frame adjustment method to result in a better frame insertion effect for complex moving scenarios and guarantee the final play effect of video by employing a quantization neural network to perform estimation on motion of a target object in two adjacent video frames; enables the video frame adjustment method to be executed on a mobile terminal in real time by designing an efficient quantization neural network; and enables the video frame adjustment method to be more robust and the fused intermediate frame to be more natural and realistic by predicting a masked image through a mask network.

It can be understood that not all two adjacent video frames are suitable for being inserted an intermediate frame therebetween. For example, it is usually impossible to estimate a reasonable intermediate frame in a scenario of shot switching or strenuous motion. Therefore, in order to guarantee the play effect of the target video after the frame insertion, on the basis of the above embodiments, in one implementation, before inserting the intermediate frame between the first video frame and the second video frame, the method further comprises: determining whether it is suitable to insert the intermediate frame between the first video frame and the second video frame based on motion features and/or color features of a target object in the first video frame and the second video frame, and continuing to perform the step of inserting the intermediate frame between the first video frame and the second video frame if it is determined that it is suitable to insert the intermediate frame between the first video frame and the second video frame. If it is determined, after deciding, that it is not suitable to insert the intermediate frame between the first video frame and the second video frame, the above operation of inserting the intermediate frame between the first video frame and the second video frame is not performed, so as to avoid introducing artifacts into the obtained target video, thereby achieving the purpose of guaranteeing the quality of video picture after the frame insertion while increasing the video play fluency. Specifically, whether it is suitable to insert the intermediate frame between the first video frame and the second video frame can be decided by analysis of motion features, for example by counting relevant metrics from color information and motion information.

Further, in one implementation, the motion features of the target object in the first video frame and the second video frame include at least one of: consistency between the third optical flow and the fourth optical flow; the number of optical flow void points in the intermediate frame, if there is no pixel point in the first video frame and the second video frame that has a preset relationship with a specific pixel point in the intermediate frame, the specific pixel point is determined as an optical flow void point, that is, if there is no second pixel point P on the first video frame I_0 that has a preset relationship with the first pixel point Q on the intermediate frame I_t, the first pixel point Q is marked as an optical void point.

The color features of the target object in the first video frame and the second video frame include: a grayscale difference between a first transformed frame and a second transformed frame. The first transformed frame is obtained by performing image affine transformation on the first video frame, and the second transformed frame is obtained by performing image affine transformation on the second video frame.

Specifically, if the motion feature of the target object in the first video frame and the second video frame is the consistency between the third optical flow and the fourth optical flow, deciding whether it is suitable to insert the intermediate frame between the first video frame and the second video frame based on the consistency between the third optical flow and the fourth optical flow, comprises:

determining, for linear motion, a linear motion offset distance according to a forward motion vector of a target pixel point on the intermediate frame moving from the intermediate frame to the first video frame and a backward motion vector of the target pixel point moving from the intermediate frame to the second video frame; counting a proportion of the number of pixels for which the linear motion offset distance is greater than a first set threshold; determining that it is suitable to insert the intermediate frame between the first video frame and the second video frame if the proportion of the number of pixels is less than or equal to a second set threshold; determining that it is not suitable to insert the intermediate frame between the first video frame and the second video frame if the proportion of the number of pixels is greater than the second set threshold. Whether an optical flow is reliable is decided by calculating the consistency between the third optical flow flowt0 from the intermediate frame I_t to the first video frame I_0 and the fourth optical flow flowt1 from the intermediate frame I_t to the second video frame I_1. Under an assumption of linear motion, a forward motion vector of a certain pixel point (i.e., the target pixel point) on the intermediate frame moving from the intermediate frame to the first video frame and a backward motion vector of the target pixel point moving from the intermediate frame to the second video frame should be equal in magnitude and opposite in direction. For a certain pixel point Q on the intermediate frame, the linear motion offset distance can be calculated from its forward motion vector $f_{r0}$ and backward motion vector $f_{r1}$: distance=$\|f_{r0}+f_{r1}\|^2$, and the proportion of all the pixels for which the linear motion offset distance is greater than the first set threshold, that is, the proportion of the number of the pixels for which the linear motion offset distance is greater than the first set threshold to the total number of pixels on the intermediate frame, is counted. If the proportion is greater than the second set threshold, it is decided that it is not suitable to insert the intermediate frame between the first video frame and the second video frame.

In one implementation, if the grayscale difference between the first transformed frame and the second transformed frame is greater than a third set threshold, it is decided that it is not suitable to insert the intermediate frame between the first video frame and the second video frame.

In one implementation, in an implementation of the above step 120, the optical flow void points in the intermediate frame, that often occur in the masked region, have been marked, and the number of the optical flow void points is counted. The larger the number is, the larger the area of the masked region is. If the area of the masked region is too large, the frame insertion is prone to errors. Therefore, in order to guarantee the quality of video picture, then in this case, no frame insertion is performed between the first video frame and the second video frame, so as to avoid introducing artifacts into the target video obtained after the frame insertion, thereby guaranteeing the quality of video picture after the frame insertion while increasing the video play fluency.

Figure 6:
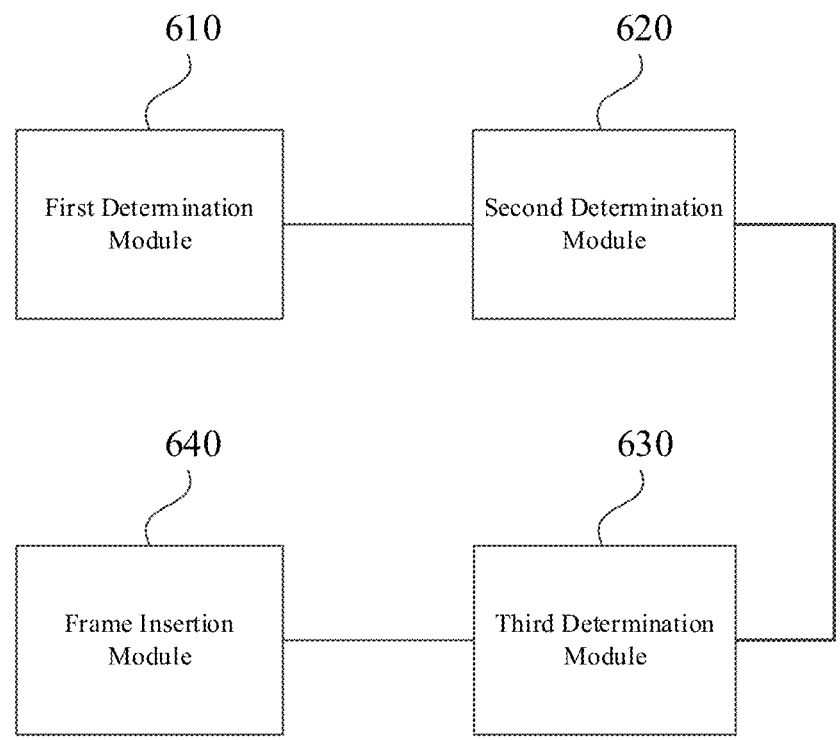
FIG. 6 is a structural schematic diagram of a video frame adjustment apparatus in an embodiment of the present disclosure.

FIG. 6 is a structural schematic diagram of a video frame adjustment apparatus in an embodiment of the present disclosure. The video frame adjustment apparatus provided by the embodiment of the present disclosure may be configured in a terminal. As shown in FIG. 6, the video frame adjustment apparatus specifically includes a first determination module 610, a second determination module 620, a third determination module 630 and a frame insertion module 640.

The first determination module 610 is configured to determine, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames. The second determination module 620 is configured to determine, based on the first optical flow and the second optical flow, a third optical flow from an intermediate frame to the first video frame and a fourth optical flow from the intermediate frame to the second video frame, in which the intermediate frame is an estimated video frame to be inserted between the first video frame and the second video frame. The third determination module 630 is configured to determine the intermediate frame according to the first video frame, the second video frame, the third optical flow and the fourth optical flow. The frame insertion module 640 is configured to insert, in the initial video, the intermediate frame between the first video frame and the second video frame to obtain a target video.

Optionally, the second determination module 620 includes:

a first determination unit, configured to determine, based on the first optical flow, the second optical flow and a moving trajectory of a target object in the first video frame and the second video frame, a fifth optical flow from the first video frame to the intermediate frame and a sixth optical flow from the second video frame to the intermediate frame; a second determination unit, configured to determine, through an optical flow inversion technology, the third optical flow based on the fifth optical flow and the fourth optical flow based on the sixth optical flow.

Optionally, the second determination unit includes:

a first determination subunit, configured to: if a first pixel point on the intermediate frame has a preset relationship with a unique second pixel point on the first video frame, a first optical flow vector of the first pixel point from the intermediate frame to the first video frame is an inverse vector of a second optical flow vector of the second pixel point from the first video frame to the intermediate frame, in which the fifth optical flow includes the second optical flow vector; if the first pixel point on the intermediate frame has a preset relationship with at least two second pixel points on the first video frame, the first optical flow vector is a weighted average of inverse vectors of second optical flow vectors of the at least two second pixel points respectively from the first video frame to the intermediate frame; if there is no second pixel point on the first video frame that has a preset relationship with the first pixel point on the intermediate frame, the first optical flow vector is 0; the first optical flow vectors of each of the first pixel points on the intermediate frame from the intermediate frame to the first video frame constitute the third optical flow.

Optionally, the second determination unit further includes:

a second determination subunit, configured to: if a third pixel point on the intermediate frame has a preset relationship with a unique fourth pixel point on the second video frame, a third optical flow vector of the third pixel point from the intermediate frame to the second video frame is an inverse vector of a fourth optical flow vector of the fourth pixel point from the second video frame to the intermediate frame, in which the sixth optical flow includes the fourth optical flow vector; if the third pixel point on the intermediate frame has a preset relationship with at least two fourth pixel points on the second video frame, the third optical flow vector is a weighted average of inverse vectors of the fourth optical flow vectors of the at least two fourth pixel points respectively from the second video frame to the intermediate frame; if there is no fourth pixel point on the second video frame that has a preset relationship with the third pixel point on the intermediate frame, the third optical flow vector is 0; the third optical flow vectors of each of the third pixel points on the intermediate frame from the intermediate frame to the second video frame constitute the fourth optical flow.

Optionally, the quantization neural network includes an encoder module, a decoder module and two optical flow prediction branches that are cascaded; in which the encoder module includes a down-sampling unit and an encoding unit, in which the down-sampling unit is configured to down-sample the input first video frame and second video frame respectively, and input the down-sampled image of the first video frame and the down-sampled image of the second video frame to the encoding unit, so that the encoding unit performs feature extraction based on the down-sampled images to obtain codes of a feature image; the decoder module includes a decoding unit and an up-sampling unit, in which the decoding unit is configured to decode the codes of the feature image and input the decoded feature image to the up-sampling unit, so that the up-sampling unit up-samples the decoded feature image and inputs the obtained up-sampled image to the two optical flow prediction branches respectively, in order for one of the two optical flow prediction branches to predict the first optical flow based on the up-sampled image, and for the other of the two optical flow prediction branches to predict the second optical flow based on the up-sampled image.

Optionally, the third determination module 630 includes:

a transformation unit, configured to perform image affine transformation on the first video frame, to obtain a first transformed frame of the first video frame at a timing when the intermediate frame is acquired; perform image affine transformation on the second video frame, to obtain a second transformed frame of the second video frame at a timing when the intermediate frame is acquired; a prediction unit, configured to predict, based on the down-sampled image corresponding to the first video frame, the down-sampled image corresponding to the second video frame, the first transformed frame, the second transformed frame, the third optical flow and the fourth optical flow, fusion weights of the first transformed frame and second transformed frame through a preset neural network; a fusion unit, configured to fuse pixels in the first transformed frame and the second transformed frame based on the fusion weights to obtain the intermediate frame, in which a fusion weight represents a probability that a pixel on the intermediate frame comes from the first video frame or the second video frame.

Optionally, the video frame adjustment apparatus further comprises:

a decision module, configured to determine, before inserting the intermediate frame between the first video frame and the second video frame, whether it is suitable to insert the intermediate frame between the first video frame and the second video frame based on motion features and/or color features of a target object in the first video frame and the second video frame, and continuing to perform the step of inserting the intermediate frame between the first video frame and the second video frame if it is determined that it is suitable to insert the intermediate frame between the first video frame and the second video frame. Optionally, the motion features of the target object in the first video frame and the second video frame include at least one of: consistency between the third optical flow and the fourth optical flow; the number of optical flow void points in the intermediate frame, in which if there is no pixel point in the first video frame and the second video frame that has a preset relationship with a specific pixel point in the intermediate frame, the specific pixel point is determined as an optical flow void point; the color features of the target object in the first video frame and the second video frame include: a grayscale difference between the first transformed frame and the second transformed frame, in which the first transformed frame is obtained by performing image affine transformation on the first video frame, and the second transformed frame is obtained by performing image affine transformation on the second video frame.

Optionally, if the motion feature of the target object in the first video frame and the second video frame is the consistency between the third optical flow and the fourth optical flow, the decision module is specifically configured to: determine, for linear motion, a linear motion offset distance according to a forward motion vector of a target pixel point on the intermediate frame moving from the intermediate frame to the first video frame and a backward motion vector of the target pixel point moving from the intermediate frame to the second video frame; count a proportion of the number of pixels for which the linear motion offset distance is greater than a first set threshold; determine that it is suitable to insert the intermediate frame between the first video frame and the second video frame if the proportion of the number of pixels is less than or equal to a second set threshold.

The video frame adjustment apparatus provided by the embodiments of the present disclosure: enables the video frame adjustment method to result in a better frame insertion effect for complex moving scenarios and guarantee the final play effect of video by employing a quantization neural network to perform estimation on motion of a target object in two adjacent video frames; enables the video frame adjustment method to be executed on a mobile terminal in real time by designing an efficient quantization neural network; and enables the video frame adjustment method to be more robust and the fused intermediate frame to be more natural and realistic by predicting a masked image through a mask network. By adding an adaptive frame insertion decision algorithm, it is decided before frame insertion whether it is suitable to insert an intermediate frame between two adjacent video frames, and if not, the intermediate frame is not inserted between the two video frames, so as to avoid introducing motion artifacts, thereby achieving the purpose of guaranteeing the quality of video picture while increasing the video frame rate.

The video frame adjustment apparatus provided by the embodiments of the present disclosure can execute the steps in the video frame adjustment method provided by the embodiments of the present disclosure, and has corresponding execution steps and beneficial effects, which will not be detailed here.

Figure 7:
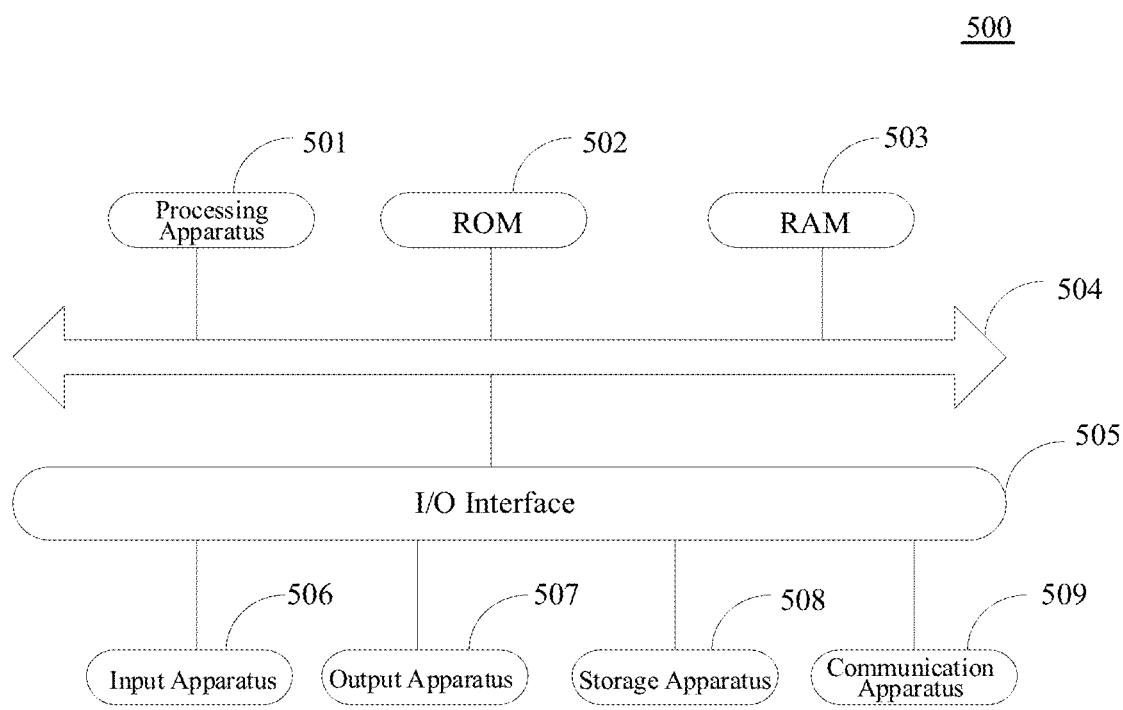
FIG. 7 is a structural schematic diagram of an electronic device in an embodiment of the present disclosure.

FIG. 7 is a structural schematic diagram of an electronic device in an embodiment of the present disclosure is a structural schematic. Reference is made to FIG. 7 below, which illustrates a schematic structural diagram of an electronic device 500 suitable for implementing some embodiments of the present disclosure. The electronic device 500 in the embodiments of the present disclosure may include but are not limited to a mobile terminal such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and a fixed terminal such as a digital TV, a desktop computer, a smart home device or the like. The electronic device illustrated in FIG. 7 is merely an example, and should not pose any limitation to the functions and the range of use of the embodiments of the present disclosure.

As illustrated in FIG. 7, the electronic device 500 may include a processing apparatus 501 (e.g., a central processing unit, a graphics processing unit, etc.), which can perform various suitable actions and processing according to a program stored in a read-only memory (ROM) 502 or a program loaded from a storage apparatus 508 into a random-access memory (RAM) 503. The RAM 503 further stores various programs and data required for operations of the electronic device 500. The processing apparatus 501, the ROM 502, and the RAM 503 are interconnected by means of a bus 504. An input/output (I/O) interface 505 is also connected to the bus 504.

Usually, the following apparatuses may be connected to the I/O interface 505: an input apparatus 506 including, for example, a touch screen, a touch pad, a keyboard, a mouse, a camera, a microphone, an accelerometer, a gyroscope, or the like; an output apparatus 507 including, for example, a liquid crystal display (LCD), a loudspeaker, a vibrator, or the like; a storage apparatus 508 including, for example, a magnetic tape, a hard disk, or the like; and a communication apparatus 509. The communication apparatus 509 may allow the electronic device 500 to be in wireless or wired communication with other devices to exchange data. While FIG. 7 illustrates the electronic device 500 having various apparatuses, it should be understood that not all of the illustrated apparatuses are necessarily implemented or included. More or fewer apparatuses may be implemented or included alternatively.

Particularly, according to embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 509 and installed, or may be installed from the storage apparatus 508, or may be installed from the ROM 502. When the computer program is executed by the processing apparatus 501, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program codes contained on the computer-readable medium may be transmitted by using any suitable medium, including but not limited to an electric wire, a fiber-optic cable, radio frequency (RF) and the like, or any appropriate combination of them.

When implemented in software, it can be fully or partially implemented in the form of a computer program product. The computer program product includes one or more computer instructions. When the computer program instructions are loaded and executed on a computer, the flows or functions according to the embodiments of the present application are generated in a whole or in part. The computer can be a general-purpose computer, a special-purpose computer, a computer network, or other programmable apparatus. The computer instructions can be stored in a computer-readable storage medium or transmitted from one computer-readable storage medium to another. For example, the computer instructions can be transmitted from a website, computer, server or data center to another website, computer, server or data center by wire (such as coaxial cable, optical fiber, digital subscriber line (DSL)) or wirelessly (such as infrared, radio, microwave, etc.). The computer-readable storage medium can be any available medium that a computer can access or a data storage device such as a server or a data center that contains one or more available media. The available medium can be a magnetic medium (e.g., floppy disk, hard disk, magnetic tape), an optical medium (e.g., digital video disc (DVD)), or a semiconductor medium (e.g., solid state disk (SSD)) and the like.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), an internet (e.g., the Internet), and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to:

determine, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames; determine, based on the first optical flow and the second optical flow, a third optical flow from an intermediate frame to the first video frame and a fourth optical flow from the intermediate frame to the second video frame, wherein the intermediate frame is an estimated video frame to be inserted between the first video frame and the second video frame; determine the intermediate frame according to the first video frame, the second video frame, the third optical flow and the fourth optical flow; insert, in the initial video, the intermediate frame between the first video frame and the second video frame to obtain a target video.

Optionally, when the one or more programs are executed by the electronic device, the electronic device further performs other steps described in the embodiments above.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, there is provided a video frame adjustment method, comprising: determining, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames; determining, based on the first optical flow and the second optical flow, a third optical flow from an intermediate frame to the first video frame and a fourth optical flow from the intermediate frame to the second video frame, wherein the intermediate frame is an estimated video frame to be inserted between the first video frame and the second video frame; determining the intermediate frame according to the first video frame, the second video frame, the third optical flow and the fourth optical flow; inserting, in the initial video, the intermediate frame between the first video frame and the second video frame to obtain a target video.

According to one or more embodiments of the present disclosure, in the video frame adjustment method provided by the present disclosure, optionally, the determining, based on the first optical flow and the second optical flow, the third optical flow from an intermediate frame to the first video frame and the fourth optical flow from the intermediate frame to the second video frame comprises: determining, based on the first optical flow, the second optical flow and a moving trajectory of a target object in the first video frame and the second video frame, a fifth optical flow from the first video frame to the intermediate frame and a sixth optical flow from the second video frame to the intermediate frame; determining, through an optical flow inversion technology, the third optical flow based on the fifth optical flow and the fourth optical flow based on the sixth optical flow.

According to one or more embodiments of the present disclosure, in the video frame adjustment method provided by the present disclosure, optionally, the determining, through the optical flow inversion technology, the third optical flow based on the fifth optical flow comprises: if a first pixel point on the intermediate frame has a preset relationship with a unique second pixel point on the first video frame, a first optical flow vector of the first pixel point from the intermediate frame to the first video frame is an inverse vector of a second optical flow vector of the second pixel point from the first video frame to the intermediate frame, wherein the fifth optical flow includes the second optical flow vector; if the first pixel point on the intermediate frame has a preset relationship with at least two second pixel points on the first video frame, the first optical flow vector is a weighted average of inverse vectors of second optical flow vectors of the at least two second pixel points respectively from the first video frame to the intermediate frame; if there is no second pixel point on the first video frame that has a preset relationship with the first pixel point on the intermediate frame, the first optical flow vector is 0; constituting the third optical flow with the first optical flow vectors of each of the first pixel points on the intermediate frame from the intermediate frame to the first video frame.

According to one or more embodiments of the present disclosure, in the video frame adjustment method provided by the present disclosure, optionally, the determining the fourth optical flow based on the sixth optical flow comprises: if a third pixel point on the intermediate frame has a preset relationship with a unique fourth pixel point on the second video frame, a third optical flow vector of the third pixel point from the intermediate frame to the second video frame is an inverse vector of a fourth optical flow vector of the fourth pixel point from the second video frame to the intermediate frame, wherein the sixth optical flow includes the fourth optical flow vector; if the third pixel point on the intermediate frame has a preset relationship with at least two fourth pixel points on the second video frame, the third optical flow vector is a weighted average of inverse vectors of the fourth optical flow vectors of the at least two fourth pixel points respectively from the second video frame to the intermediate frame; if there is no fourth pixel point on the second video frame that has a preset relationship with the third pixel point on the intermediate frame, the third optical flow vector is 0; constituting the fourth optical flow with the third optical flow vectors of each of the third pixel points on the intermediate frame from the intermediate frame to the second video frame.

According to one or more embodiments of the present disclosure, in the video frame adjustment method provided by the present disclosure, optionally, the quantization neural network includes an encoder module, a decoder module and two optical flow prediction branches that are cascaded; wherein the encoder module includes a down-sampling unit and an encoding unit, wherein the down-sampling unit is configured to down-sample the input first video frame and second video frame respectively, and input the down-sampled image of the first video frame and the down-sampled image of the second video frame to the encoding unit, so that the encoding unit performs feature extraction based on the down-sampled images to obtain codes of a feature image; the decoder module includes a decoding unit and an up-sampling unit, wherein the decoding unit is configured to decode the codes of the feature image and input the decoded feature image to the up-sampling unit, so that the up-sampling unit up-samples the decoded feature image and inputs the obtained up-sampled image to the two optical flow prediction branches respectively, in order for one of the two optical flow prediction branches to predict the first optical flow based on the up-sampled image, and for the other of the two optical flow prediction branches to predict the second optical flow based on the up-sampled image.

According to one or more embodiments of the present disclosure, in the video frame adjustment method provided by the present disclosure, optionally, the determining the intermediate frame according to the first video frame, the second video frame, the third optical flow and the fourth optical flow comprises: performing image affine transformation on the first video frame, to obtain a first transformed frame of the first video frame at a timing when the intermediate frame is acquired; performing image affine transformation on the second video frame, to obtain a second transformed frame of the second video frame at a timing when the intermediate frames acquired; predicting, based on the down-sampled image corresponding to the first video frame, the down-sampled image corresponding to the second video frame, the first transformed frame, the second transformed frame, the third optical flow and the fourth optical flow, fusion weights of the first transformed frame and second transformed frame through a preset neural network; fusing pixels in the first transformed frame and the second transformed frame based on the fusion weights to obtain the intermediate frame, wherein the fusion weight represents a probability that a pixel on the intermediate frame comes from the first video frame or the second video frame.

According to one or more embodiments of the present disclosure, in the video frame adjustment method provided by the present disclosure, optionally, before inserting the intermediate frame between the first video frame and the second video frame, the method further comprises: determining whether it is suitable to insert the intermediate frame between the first video frame and the second video frame based on motion features and/or color features of a target object in the first video frame and the second video frame, and continuing to perform the step of inserting the intermediate frame between the first video frame and the second video frame if it is determined that it is suitable to insert the intermediate frame between the first video frame and the second video frame.

According to one or more embodiments of the present disclosure, in the video frame adjustment method provided by the present disclosure, optionally, the motion features of the target object in the first video frame and the second video frame include at least one of: consistency between the third optical flow and the fourth optical flow; the number of optical flow void points in the intermediate frame, wherein if there is no pixel point in the first video frame and the second video frame that has a preset relationship with a specific pixel point in the intermediate frame, the specific pixel point is determined as an optical flow void point; the color features of the target object in the first video frame and the second video frame include: a grayscale difference between a first transformed frame and a second transformed frame, wherein the first transformed frame is obtained by performing image affine transformation on the first video frame, and the second transformed frame is obtained by performing image affine transformation on the second video frame.

According to one or more embodiments of the present disclosure, in the video frame adjustment method provided by the present disclosure, optionally, if the motion feature of the target object in the first video frame and the second video frame is the consistency between the third optical flow and the fourth optical flow, the determining whether it is suitable to insert the intermediate frame between the first video frame and the second video frame based on the consistency between the third optical flow and the fourth optical flow, comprises: determining, for linear motion, a linear motion offset distance according to a forward motion vector of a target pixel point on the intermediate frame moving from the intermediate frame to the first video frame and a backward motion vector of the target pixel point moving from the intermediate frame to the second video frame; counting a proportion of the number of pixels for which the linear motion offset distance is greater than a first set threshold; determining that it is suitable to insert the intermediate frame between the first video frame and the second video frame if the proportion of the number of pixels is less than or equal to a second set threshold.

According to one or more embodiments of the present disclosure, there is provided a video frame adjustment apparatus, comprising: a first determination module, configured to determine, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames; a second determination module, configured to determine, based on the first optical flow and the second optical flow, a third optical flow from an intermediate frame to the first video frame and a fourth optical flow from the intermediate frame to the second video frame, wherein the intermediate frame is an estimated video frame to be inserted between the two initial video frames; a third determination module, configured to determine the intermediate frame according to the first video frame, the second video frame, the third optical flow and the fourth optical flow; a frame insertion module, configured to insert, in the initial video, the video image between the two initial video frames to obtain a target video.

According to one or more embodiments of the present disclosure, in the video frame adjustment apparatus provided by the present disclosure, optionally, the second determination module includes: a first determination unit, configured to determine, based on the first optical flow, the second optical flow and a moving trajectory of a target object in the first video frame and the second video frame, a fifth optical flow from the first video frame to the intermediate frame and a sixth optical flow from the second video frame to the intermediate frame; a second determination unit, configured to determine, through an optical flow inversion technology, the third optical flow based on the fifth optical flow and the fourth optical flow based on the sixth optical flow.

According to one or more embodiments of the present disclosure, in the video frame adjustment apparatus provided by the present disclosure, optionally, the second determination unit includes: a first determination subunit, configured to: if a first pixel point on the intermediate frame has a preset relationship with a unique second pixel point on the first video frame, a first optical flow vector of the first pixel point from the intermediate frame to the first video frame is an inverse vector of a second optical flow vector of the second pixel point from the first video frame to the intermediate frame, in which the fifth optical flow includes the second optical flow vector; if the first pixel point on the intermediate frame has a preset relationship with at least two second pixel points on the first video frame, the first optical flow vector is a weighted average of inverse vectors of second optical flow vectors of the at least two second pixel points respectively from the first video frame to the intermediate frame; if there is no second pixel point on the first video frame that has a preset relationship with the first pixel point on the intermediate frame, the first optical flow vector is 0; the first optical flow vectors of each of the first pixel points on the intermediate frame from the intermediate frame to the first video frame constitute the third optical flow.

According to one or more embodiments of the present disclosure, in the video frame adjustment apparatus provided by the present disclosure, optionally, the second determination unit further includes: a second determination subunit, configured to: if a third pixel point on the intermediate frame has a preset relationship with a unique fourth pixel point on the second video frame, a third optical flow vector of the third pixel point from the intermediate frame to the second video frame is an inverse vector of a fourth optical flow vector of the fourth pixel point from the second video frame to the intermediate frame, in which the sixth optical flow includes the fourth optical flow vector; if the third pixel point on the intermediate frame has a preset relationship with at least two fourth pixel points on the second video frame, the third optical flow vector is a weighted average of inverse vectors of the fourth optical flow vectors of the at least two fourth pixel points respectively from the second video frame to the intermediate frame; if there is no fourth pixel point on the second video frame that has a preset relationship with the third pixel point on the intermediate frame, the third optical flow vector is 0; the third optical flow vectors of each of the third pixel points on the intermediate frame from the intermediate frame to the second video frame constitute the fourth optical flow.

According to one or more embodiments of the present disclosure, in the video frame adjustment apparatus provided by the present disclosure, optionally, the quantization neural network includes an encoder module, a decoder module and two optical flow prediction branches that are cascaded; in which the encoder module includes a down-sampling unit and an encoding unit, in which the down-sampling unit is configured to down-sample the input first video frame and second video frame respectively, and input the down-sampled image of the first video frame and the down-sampled image of the second video frame to the encoding unit, so that the encoding unit performs feature extraction based on the down-sampled images to obtain codes of a feature image; the decoder module includes a decoding unit and an up-sampling unit, in which the decoding unit is configured to decode the codes of the feature image and input the decoded feature image to the up-sampling unit, so that the up-sampling unit up-samples the decoded feature image and inputs the obtained up-sampled image to the two optical flow prediction branches respectively, in order for one of the two optical flow prediction branches to predict the first optical flow based on the up-sampled image, and for the other of the two optical flow prediction branches to predict the second optical flow based on the up-sampled image.

According to one or more embodiments of the present disclosure, in the video frame adjustment apparatus provided by the present disclosure, optionally, the third determination module includes: a transformation unit, configured to perform image affine transformation on the first video frame, to obtain a first transformed frame of the first video frame at a timing when the intermediate frame is acquired; perform image affine transformation on the second video frame, to obtain a second transformed frame of the second video frame at a timing when the intermediate frame is acquired; a prediction unit, configured to predict, based on the down-sampled image corresponding to the first video frame, the down-sampled image corresponding to the second video frame, the first transformed frame, the second transformed frame, the third optical flow and the fourth optical flow, fusion weights of the first transformed frame and second transformed frame through a preset neural network; a fusion unit, configured to fuse pixels in the first transformed frame and the second transformed frame based on the fusion weights to obtain the intermediate frame, in which a fusion weight represents a probability that a pixel on the intermediate frame comes from the first video frame or the second video frame.

According to one or more embodiments of the present disclosure, in the video frame adjustment apparatus provided by the present disclosure, optionally, the video frame adjustment apparatus further comprises: a decision module, configured to determine, before inserting the intermediate frame between the first video frame and the second video frame, whether it is suitable to insert the intermediate frame between the first video frame and the second video frame based on motion features and/or color features of a target object in the first video frame and the second video frame, and continuing to perform the step of inserting the intermediate frame between the first video frame and the second video frame if it is determined that it is suitable to insert the intermediate frame between the first video frame and the second video frame.

According to one or more embodiments of the present disclosure, in the video frame adjustment apparatus provided by the present disclosure, optionally, the motion features of the target object in the first video frame and the second video frame include at least one of: consistency between the third optical flow and the fourth optical flow; the number of optical flow void points in the intermediate frame, if there is no pixel point in the first video frame and the second video frame that has a preset relationship with a specific pixel point in the intermediate frame, the specific pixel point is determined as an optical flow void point; the color features of the target object in the first video frame and the second video frame include: a grayscale difference between the first transformed frame and the second transformed frame, in which the first transformed frame is obtained by performing image affine transformation on the first video frame, and the second transformed frame is obtained by performing image affine transformation on the second video frame.

According to one or more embodiments of the present disclosure, in the video frame adjustment apparatus provided by the present disclosure, optionally, if the motion feature of the target object in the first video frame and the second video frame is the consistency between the third optical flow and the fourth optical flow, the decision module is specifically configured to: determine, for linear motion, a linear motion offset distance according to a forward motion vector of a target pixel point on the intermediate frame moving from the intermediate frame to the first video frame and a backward motion vector of the target pixel point moving from the intermediate frame to the second video frame; count a proportion of the number of pixels for which the linear motion offset distance is greater than a first set threshold; determine that it is suitable to insert the intermediate frame between the first video frame and the second video frame if the proportion of the number of pixels is less than or equal to a second set threshold.

According to one or more embodiments of the present disclosure, there is provided an electronic device, comprising: one or more processors; a storage, configured to store one or more programs; the one or more programs, when executed by the one or more processors, cause the one or more processors to implement the video frame adjustment method provided by any of the embodiments of the present disclosure.

According to one or more embodiments of the present disclosure, there is provided a computer-readable storage medium having stored thereon a computer program which, when executed by a processor, implements the video frame adjustment method provided by any of the embodiments of the present disclosure.

According to one or more embodiments of the present disclosure, there is provided a computer program product comprising computer programs or instructions which, when executed by a processor, implements the video frame adjustment method provided by any of the embodiments of the present disclosure.

The above description is only the preferred embodiments of the present disclosure and the illustration of the applied technical principles. It should be understood by those skilled in the art that the disclosed scope involved in the present disclosure is not limited to technical schemes formed by specific combinations of the above technical features, but also covers other technical schemes formed by any combination of the above technical features or their equivalent features without departing from the above disclosed concept, for example, the technical schemes formed by replacing the above features and the technical features (but not limited to) with similar functions disclosed in the present disclosure with each other.

Furthermore, although various operations are depicted in a particular order, this should not be understood as requiring these operations to be performed in the particular order shown or in a sequential order. In certain circumstances, multitasking and parallel processing may be advantageous. Likewise, although several specific implementation details are contained in the above discussion, these should not be construed as limiting the scope of the present disclosure. Certain features described in the context of separate embodiments can also be implemented in a single embodiment in combination. Rather, various features described in the context of a single embodiment can also be implemented in multiple embodiments individually or in any suitable sub-combination.

Although the subject matter has been described in language specific to structural features and/or methodological logical actions, it should be understood that the subject matter defined in the appended claims is not necessarily limited to the specific features or actions described above. Rather, the specific features and actions described above are merely exemplary forms of implementing the claims.

The invention claimed is:

1. A video frame adjustment method, comprising:
determining, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames;
determining, based on the first optical flow and the second optical flow, a third optical flow from an intermediate frame to the first video frame and a fourth optical flow from the intermediate frame to the second video frame, wherein the intermediate frame is an estimated video frame to be inserted between the first video frame and the second video frame;
determining the intermediate frame according to the first video frame, the second video frame, the third optical flow and the fourth optical flow;
inserting, in the initial video, the intermediate frame between the first video frame and the second video frame to obtain a target video,
wherein the determining, based on the first optical flow and the second optical flow, the third optical flow from the intermediate frame to the first video frame and the fourth optical flow from the intermediate frame to the second video frame comprises:
determining, based on the first optical flow, the second optical flow and a moving trajectory of a target object in the first video frame and the second video frame, a fifth optical flow from the first video frame to the intermediate frame and a sixth optical flow from the second video frame to the intermediate frame;
determining, through an optical flow inversion technology, the third optical flow based on the fifth optical flow and the fourth optical flow based on the sixth optical flow.

2. The method according to claim 1, wherein the determining, through the optical flow inversion technology, the third optical flow based on the fifth optical flow comprises:
if a first pixel point on the intermediate frame has a preset relationship with a unique second pixel point on the first video frame, a first optical flow vector of the first pixel point from the intermediate frame to the first video frame is an inverse vector of a second optical flow vector of the second pixel point from the first video frame to the intermediate frame, wherein the fifth optical flow includes the second optical flow vector;
if the first pixel point on the intermediate frame has a preset relationship with at least two second pixel points on the first video frame, the first optical flow vector is a weighted average of inverse vectors of second optical flow vectors of the at least two second pixel points respectively from the first video frame to the intermediate frame;
if there is no second pixel point on the first video frame that has a preset relationship with the first pixel point on the intermediate frame, the first optical flow vector is 0;
constituting the third optical flow with the first optical flow vectors of each of the first pixel points on the intermediate frame from the intermediate frame to the first video frame.

3. The method according to claim 1, wherein the determining the fourth optical flow based on the sixth optical flow comprises:
if a third pixel point on the intermediate frame has a preset relationship with a unique fourth pixel point on the second video frame, a third optical flow vector of the third pixel point from the intermediate frame to the second video frame is an inverse vector of a fourth optical flow vector of the fourth pixel point from the second video frame to the intermediate frame, wherein the sixth optical flow includes the fourth optical flow vector;
if the third pixel point on the intermediate frame has a preset relationship with at least two fourth pixel points on the second video frame, the third optical flow vector is a weighted average of inverse vectors of the fourth optical flow vectors of the at least two fourth pixel points respectively from the second video frame to the intermediate frame;
if there is no fourth pixel point on the second video frame that has a preset relationship with the third pixel point on the intermediate frame, the third optical flow vector is 0;
the third optical flow vectors of each of the third pixel points on the intermediate frame from the intermediate frame to the second video frame constitutes the fourth optical flow.

4. The method according to claim 1, wherein the quantization neural network includes an encoder module, a decoder module and two optical flow prediction branches that are cascaded;
wherein the encoder module includes a down-sampling unit and an encoding unit, the down-sampling unit is configured to down-sample the input first video frame and second video frame respectively, and input the down-sampled image of the first video frame and the down-sampled image of the second video frame to the encoding unit, so that the encoding unit performs feature extraction based on the down-sampled images to obtain codes of a feature image;
the decoder module includes a decoding unit and an up-sampling unit, wherein the decoding unit is configured to decode the codes of the feature image and input the decoded feature image to the up-sampling unit, so that the up-sampling unit up-samples the decoded feature image and inputs the obtained up-sampled image to the two optical flow prediction branches respectively, in order for one of the two optical flow prediction branches to predict the first optical flow based on the up-sampled image, and for the other of the two optical flow prediction branches to predict the second optical flow based on the up-sampled image.

5. The method according to claim 4, wherein the determining the intermediate frame according to the first video frame, the second video frame, the third optical flow and the fourth optical flow comprises:
performing image affine transformation on the first video frame, to obtain a first transformed frame of the first video frame at a timing when the intermediate frame is acquired;
performing image affine transformation on the second video frame, to obtain a second transformed frame of the second video frame at a timing when the intermediate frames acquired;
predicting, based on the down-sampled image corresponding to the first video frame, the down-sampled image corresponding to the second video frame, the first transformed frame, the second transformed frame, the third optical flow and the fourth optical flow, fusion weights of the first transformed frame and second transformed frame through a preset neural network;

fusing pixels in the first transformed frame and the second transformed frame based on the fusion weights to obtain the intermediate frame, wherein the fusion weight represents a probability that a pixel on the intermediate frame comes from the first video frame or the second video frame.

6. The method according to claim 1, wherein before inserting the intermediate frame between the first video frame and the second video frame, the method further comprises:

determining whether it is suitable to insert the intermediate frame between the first video frame and the second video frame based on motion features and/or color features of a target object in the first video frame and the second video frame, and continuing to perform a step of inserting the intermediate frame between the first video frame and the second video frame if it is determined that it is suitable to insert the intermediate frame between the first video frame and the second video frame.

7. The method according to claim 6, wherein the motion features of the target object in the first video frame and the second video frame include at least one of:

consistency between the third optical flow and the fourth optical flow;

a number of optical flow void points in the intermediate frame, wherein if there is no pixel point in the first video frame and the second video frame that has a preset relationship with a specific pixel point in the intermediate frame, the specific pixel point is determined as an optical flow void point;

the color features of the target object in the first video frame and the second video frame include:

a grayscale difference between a first transformed frame and a second transformed frame, wherein the first transformed frame is obtained by performing image affine transformation on the first video frame, and the second transformed frame is obtained by performing image affine transformation on the second video frame.

8. The method according to claim 6, wherein if the motion feature of the target object in the first video frame and the second video frame is the consistency between the third optical flow and the fourth optical flow, determining whether it is suitable to insert the intermediate frame between the first video frame and the second video frame based on the consistency between the third optical flow and the fourth optical flow, comprises:

determining, for linear motion, a linear motion offset distance according to a forward motion vector of a target pixel point on the intermediate frame moving from the intermediate frame to the first video frame and a backward motion vector of the target pixel point moving from the intermediate frame to the second video frame;

counting a proportion of a number of pixels for which the linear motion offset distance is greater than a first set threshold;

determining that it is suitable to insert the intermediate frame between the first video frame and the second video frame if the proportion of the number of pixels is less than or equal to a second set threshold.

9. An electronic device, comprising:
one or more processors;
a storage apparatus, configured to store one or more programs;

the one or more programs, when executed by the one or more processors, cause the one or more processors to perform a method, wherein the method comprises:

determining, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames;

determining, based on the first optical flow and the second optical flow, a third optical flow from an intermediate frame to the first video frame and a fourth optical flow from the intermediate frame to the second video frame, wherein the intermediate frame is an estimated video frame to be inserted between the first video frame and the second video frame;

determining the intermediate frame according to the first video frame, the second video frame, the third optical flow and the fourth optical flow; and inserting, in the initial video, the intermediate frame between the first video frame and the second video frame to obtain a target video, wherein the determining, based on the first optical flow and the second optical flow, the third optical flow from the intermediate frame to the first video frame and the fourth optical flow from the intermediate frame to the second video frame comprises:

determining, based on the first optical flow, the second optical flow and a moving trajectory of a target object in the first video frame and the second video frame, a fifth optical flow from the first video frame to the intermediate frame and a sixth optical flow from the second video frame to the intermediate frame;

determining, through an optical flow inversion technology, the third optical flow based on the fifth optical flow and the fourth optical flow based on the sixth optical flow.

10. The electronic device according to claim 9, wherein the determining, through the optical flow inversion technology, the third optical flow based on the fifth optical flow comprises:

if a first pixel point on the intermediate frame has a preset relationship with a unique second pixel point on the first video frame, a first optical flow vector of the first pixel point from the intermediate frame to the first video frame is an inverse vector of a second optical flow vector of the second pixel point from the first video frame to the intermediate frame, wherein the fifth optical flow includes the second optical flow vector;

if the first pixel point on the intermediate frame has a preset relationship with at least two second pixel points on the first video frame, the first optical flow vector is a weighted average of inverse vectors of second optical flow vectors of the at least two second pixel points respectively from the first video frame to the intermediate frame;

if there is no second pixel point on the first video frame that has a preset relationship with the first pixel point on the intermediate frame, the first optical flow vector is 0;

constituting the third optical flow with the first optical flow vectors of each of the first pixel points on the intermediate frame from the intermediate frame to the first video frame.

11. The electronic device according to claim 9, wherein the determining the fourth optical flow based on the sixth optical flow comprises:
  if a third pixel point on the intermediate frame has a preset relationship with a unique fourth pixel point on the second video frame, a third optical flow vector of the third pixel point from the intermediate frame to the second video frame is an inverse vector of a fourth optical flow vector of the fourth pixel point from the second video frame to the intermediate frame, wherein the sixth optical flow includes the fourth optical flow vector;
  if the third pixel point on the intermediate frame has a preset relationship with at least two fourth pixel points on the second video frame, the third optical flow vector is a weighted average of inverse vectors of the fourth optical flow vectors of the at least two fourth pixel points respectively from the second video frame to the intermediate frame;
  if there is no fourth pixel point on the second video frame that has a preset relationship with the third pixel point on the intermediate frame, the third optical flow vector is 0;
  the third optical flow vectors of each of the third pixel points on the intermediate frame from the intermediate frame to the second video frame constitutes the fourth optical flow.

12. The electronic device according to claim 9, wherein the quantization neural network includes an encoder module, a decoder module and two optical flow prediction branches that are cascaded;
  wherein the encoder module includes a down-sampling unit and an encoding unit, the down-sampling unit is configured to down-sample the input first video frame and second video frame respectively, and input the down-sampled image of the first video frame and the down-sampled image of the second video frame to the encoding unit, so that the encoding unit performs feature extraction based on the down-sampled images to obtain codes of a feature image;
  the decoder module includes a decoding unit and an up-sampling unit, wherein the decoding unit is configured to decode the codes of the feature image and input the decoded feature image to the up-sampling unit, so that the up-sampling unit up-samples the decoded feature image and inputs the obtained up-sampled image to the two optical flow prediction branches respectively, in order for one of the two optical flow prediction branches to predict the first optical flow based on the up-sampled image, and for the other of the two optical flow prediction branches to predict the second optical flow based on the up-sampled image.

13. The electronic device according to claim 12, wherein the determining the intermediate frame according to the first video frame, the second video frame, the third optical flow and the fourth optical flow comprises:
  performing image affine transformation on the first video frame, to obtain a first transformed frame of the first video frame at a timing when the intermediate frame is acquired;
  performing image affine transformation on the second video frame, to obtain a second transformed frame of the second video frame at a timing when the intermediate frames acquired;
  predicting, based on the down-sampled image corresponding to the first video frame, the down-sampled image corresponding to the second video frame, the first transformed frame, the second transformed frame, the third optical flow and the fourth optical flow, fusion weights of the first transformed frame and second transformed frame through a preset neural network;
  fusing pixels in the first transformed frame and the second transformed frame based on the fusion weights to obtain the intermediate frame, wherein the fusion weight represents a probability that a pixel on the intermediate frame comes from the first video frame or the second video frame.

14. The electronic device according to claim 9, wherein before inserting the intermediate frame between the first video frame and the second video frame, the method further comprises:
  determining whether it is suitable to insert the intermediate frame between the first video frame and the second video frame based on motion features and/or color features of a target object in the first video frame and the second video frame, and continuing to perform a step of inserting the intermediate frame between the first video frame and the second video frame if it is determined that it is suitable to insert the intermediate frame between the first video frame and the second video frame.

15. The electronic device according to claim 14, wherein the motion features of the target object in the first video frame and the second video frame include at least one of:
  consistency between the third optical flow and the fourth optical flow;
  a number of optical flow void points in the intermediate frame, wherein if there is no pixel point in the first video frame and the second video frame that has a preset relationship with a specific pixel point in the intermediate frame, the specific pixel point is determined as an optical flow void point;
  the color features of the target object in the first video frame and the second video frame include:
  a grayscale difference between a first transformed frame and a second transformed frame, wherein the first transformed frame is obtained by performing image affine transformation on the first video frame, and the second transformed frame is obtained by performing image affine transformation on the second video frame.

16. The electronic device according to claim 14, wherein if the motion feature of the target object in the first video frame and the second video frame is the consistency between the third optical flow and the fourth optical flow, determining whether it is suitable to insert the intermediate frame between the first video frame and the second video frame based on the consistency between the third optical flow and the fourth optical flow, comprises:
  determining, for linear motion, a linear motion offset distance according to a forward motion vector of a target pixel point on the intermediate frame moving from the intermediate frame to the first video frame and a backward motion vector of the target pixel point moving from the intermediate frame to the second video frame;
  counting a proportion of a number of pixels for which the linear motion offset distance is greater than a first set threshold;
  determining that it is suitable to insert the intermediate frame between the first video frame and the second video frame if the proportion of the number of pixels is less than or equal to a second set threshold.

17. A non-transient computer-readable storage medium having stored thereon computer programs which, when executed by a processor, cause the processor to perform a method, wherein the method comprises:
- determining, based on a first video frame and a second video frame in an initial video, a first optical flow from the first video frame to the second video frame and a second optical flow from the second video frame to the first video frame through a quantization neural network, wherein the first video frame and the second video frame are two adjacent initial video frames;
- determining, based on the first optical flow and the second optical flow, a third optical flow from an intermediate frame to the first video frame and a fourth optical flow from the intermediate frame to the second video frame, wherein the intermediate frame is an estimated video frame to be inserted between the first video frame and the second video frame;
- determining the intermediate frame according to the first video frame, the second video frame, the third optical flow and the fourth optical flow; and
- inserting, in the initial video, the intermediate frame between the first video frame and the second video frame to obtain a target video, wherein the determining, based on the first optical flow and the second optical flow, the third optical flow from the intermediate frame to the first video frame and the fourth optical flow from the intermediate frame to the second video frame comprises:
- determining, based on the first optical flow, the second optical flow and a moving trajectory of a target object in the first video frame and the second video frame, a fifth optical flow from the first video frame to the intermediate frame and a sixth optical flow from the second video frame to the intermediate frame;
- determining, through an optical flow inversion technology, the third optical flow based on the fifth optical flow and the fourth optical flow based on the sixth optical flow.

* * * * *